May 11, 1965  A. J. HAWVER  3,183,020
OCCUPANT CONTROLLED ACROBATIC AMUSEMENT AND EXERCISE DEVICE
Filed Dec. 9, 1963
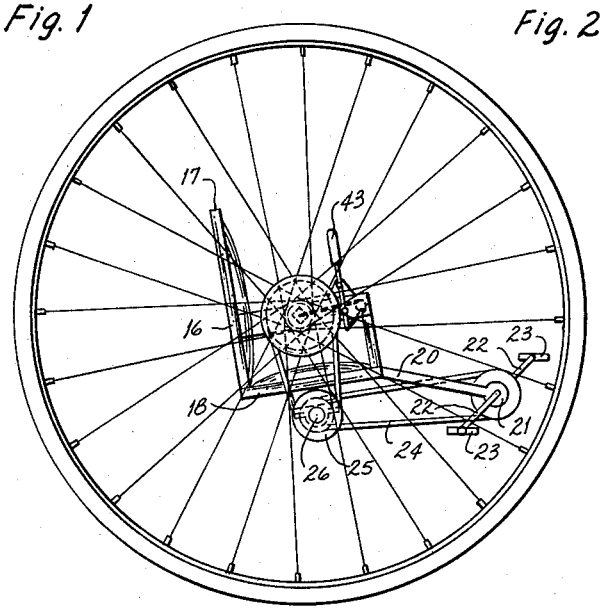
Albert J. Hawver
INVENTOR.

United States Patent Office 3,183,020
Patented May 11, 1965

3,183,020
OCCUPANT CONTROLLED ACROBATIC AMUSEMENT AND EXERCISE DEVICE
Albert J. Hawver, 3403 W. New Orleans, Tampa, Fla.
Filed Dec. 9, 1963, Ser. No. 328,878
3 Claims. (Cl. 280—208)

This invention relates to an amusement and/or exercise device of the character set forth.

In its present embodiment the invention may be generally characterized as including a pair of occupant supporting coaxial paralleled wheels. The two wheels of the vehicle, as here presented, constitute the sole ground engaging structure of the device and in this present preferred arrangement propulsion is achieved by the occupant through pedal mechanism, avoiding occupant contact with the ground or equivalent supporting surface. In this respect a safety factor is provided in that under normal occupancy the limbs of the operator are precluded from ground engagement or contact with the wheels or other extraneous elements.

While this type of structure is presented by way of illustration and constitutes one presently preferred embodiment of the invention, it will be readily understood that various aspects of the total inventive concept herein set forth may be applicable in a wide variety of devices of the present general character but departing therefrom in numerous instances in structure, design, wheel arrangement, drive facilities, control equipment, etc.

The primary concept, use and operation, of the present invention, is concerned with the support of an occupant between the parallel coaxial wheels by free suspension from the wheels but in a manner independent, except by occupant control, of the rotation of the wheels. While motivation may be through power means independent, but preferably controlled by the occupant, the present form of the invention provides pedal means by which the occupant may selectively induce rotation of either or both the wheels through manual control. Further, the invention provides for induced rotation of the seat through torque applied by the wheels to induce rocking or rotation thereof while the wheels are in relatively fixed position both with respect to the occupant support and to their ground engagement.

Since the control of each wheel, both as to propulsion and as to braking, is independently actuatable by the occupant, it will be seen that in addition to simple forward or reverse propulsion, a wide variety of various and sundry acrobatic and turning manipulations may be carried out. For instance with the propulsion applied to one wheel while the other wheel is braked a sharp turning action may be applied to the vehicle. Further, should both wheels be restrained by braking action or by an impediment in the path of travel, torque will be applied to rock the seat forwardly, backwardly or in complete rotation with respect to the axis of the supporting wheels. Obviously, through practice, dexterity of the controls may be developed to provide for amusing acrobatic antics and specialized types of exercise maneuvers.

It will thus be seen from the foregoing that it is among the primary objects of the present invention to provide a novel and improved amusement and exercise device. More specifically, it is an object of the present invention to provide a device of the character set forth utilizing a pair of parallel coaxial wheels between which the occupant is suspended. It is also an object of the present invention to provide a device of the character set forth in which the motivation for rotation of the wheels is under the individual selective control of the operator and through which motivation may be confined to either selected wheel, while on the other hand either wheel or both wheels may be retarded against rotation. Numerous other objects, features and advantages of the present invention will be apparent from a consideration of the following specification taken in conjunction with the accompanying drawings, in which:

FIG. 1 is a side elevation of one preferred embodiment of the present invention, FIG. 2 is a front elevation of that form of the invention presented by way of example in FIGURE 1, and FIG. 3 is a detailed sectional view illustrating a form of occupant support and control mechanism applicable to one of the wheels of that form of the invention shown in FIGURES 1 and 2.

In that present form of the invention herein set forth by way of example, the parallel coaxial wheels are indicated by the numerals 10 and 11. Each wheel is here shown as mounted through anti-friction bearings 12 by a hub 13 for controlled relative rotation upon a stud shaft 14.

Each stud shaft 14 is fixedly secured to and extends outwardly from a normally horizontal hollow cross bar 15, which together constitute parallel spaced intermediate arms of an occupant support. The arms are joined at one end by a frame structure 16 extending upwardly from its junction with the bars 15 to be united in a seat back bar 17. Oppositely downward extending portions of the frame 16 extend below the bars 15 to support an occupant seat 18.

From the forward edge of the seat 18, there extends a parallel pair of downwardly inclined sprocket arms 20. Between the outer ends of the arms 20, a rotatable sprocket and pulley 21 is provided to which is secured oppositely diverging pedal arms 22 to which are secured conventional foot pedals 23 in operative position with respect to an occupant on the seat 18. Over the pulley of the sprocket 21, a rearwardly extending belt 24 extends to engage a pulley 25 centrally of a shaft 26, here shown as located below the seat 18.

By this means the occupant may apply rotation to the shaft 26. On either end of the shaft 26 beyond the sides of the seat frame, there is provided a pulley 27 from which a belt 28 extends to pulleys 30 loosely mounted on the stud shaft 14 of each wheel.

For imparting rotation from either one of the pulleys 30 to its associated wheel 10, there is provided a friction clutch disc 31, loose on the stud shaft 14, and a friction drive plate 32 affixed to the hub 13 of the wheel. By this arrangement, it will be understood that the pulleys 30 may be moved axially on the stud shafts 14, as may the clutch disc 31. Such movement may be applied by a lever 45 fixedly pivoted at 46 to the stud shaft 14 and engageable by means of a roller 47 with the outer face of the pulley 30. Actuation of the shaft 45 is by way of a cable 48 engageable at 49 with the lower end of the occupant control lever 43. Thus the occupant by inner or rearward movement of the upper end of the lever 43 may tension the cable 48 to outwardly slide the pulley 30, thus inducing rotation of its associated wheel 10 through the intermediate disc clutch 31 and the clutch plate 32. It will, of course, be understood that two such levers 43 are provided so that individual movement of the wheels may be independently controlled by the occupant. The direction of rotation of the wheels through the system outlined, may be readily reversed by the occupant's reversal of his direction of rotation of the sprocket pulley 21.

With the tension on the cable 48 released, no driving power for the wheel is transmitted. The levers 43 may however be actuated to apply a resistance or braking of the wheel 10 through a cable 40 leading over the pulleys 41 and 42 from the levers 43 to the squared shank 35 to the outer end of which is mounted a brake disc 35 with its braking surface 36 adapted to engage the outer brake face of a brake disc 34 secured to hub 13. Thus when the handle 43 is moved forwardly reversing the clutching tension, the shank 35 may be drawn inwardly to apply a braking force on the associated wheel 10.

From the operation of the device, it will be seen that a normal uniform forward or reverse motion may be imparted to the wheels by the occupant through the pedal arrangement and that abrupt turning movement may be achieved by the selective braking of one or the other of the wheels through the forward motion of its associated lever 43. An important feature, however, is the fact that should the wheels be abruptly halted in their rotation, either by striking an impediment or by application of the brake, a momentary torque will automatically be applied to rock the occupant seat, even to the point of complete rotation, should the build-up momentum be sufficient. Note also that the rocking motion may be either clockwise or counter-clockwise, depending upon which direction momentum has been built up to provide the reactionary torque by which the occupant seat is tilted.

It will, of course, be understood that the invention is here shown as to its structure merely by way of illustration. Propelling force may be applied through motor means, as a battery driven electric motor, if desired, and various balancing weights may be utilized as desired for stabilizing the occupant seat and/or building up torque resistance to vary the response thereto of the occupant seat. Obviously, the drive and brake mechanism are schematically depicted and the full use of equivalents is contemplated, such as chains and sprockets rather than belts and pulleys, and braking and clutching facilities may be altered in any manner well within the scope of those versed in the mechanical arts. Such changes, modifications, and the full use of equivalents are of course not deemed to vary the scope of the claims appended hereto.

What I claim is:

1. A two wheeled exercise and amusement device comprising, in combination, a pair of spaced parallel wheels, a pair of spaced coaxial stud shafts, the inner ends of said stud shafts being perpendicularly secured one each to a pair of spaced parallel cross bars extending longitudinally of the device, said wheels being journalled one each on said stud shafts for rotation about a common axis coincident with the axes of said stud shafts, an occupant seat member fixed between said cross bars and having a seat bottom portion in substantially spaced parallel relation with respect to said common axis and a seat back portion in substantially right angular relation to said seat bottom portion and in substantially spaced relation wtih respect to said axis, said common axis extending through the bight formed by said seat bottom portion and said seat back portion, manually controlled means for independently braking said wheels with respect to their respective stud shafts by an occupant seated in said seat member, occupant actuatable pedal mechanism for rotatively motivating said wheels, said wheels motivating mechanism comprising a power transmitting clutch for each wheel and manually controlled means for actuating said clutches for independently and selectively supplying motivating power to said wheels, said pedal mechanism comprising a pulley and foot pedals for turning said pulley, said pulley being journalled at a position forward of said seat member for receiving the seat member occupant's legs in forwardly-extending relation with respect thereto, whereby the center of gravity of the occupant will be sufficiently close to said common axis and whereby said seat member will provide the necessary support to permit orbital rotation of the occupant.

2. The invention as defined in claim 1 wherein said manually controlled braking means comprises a pair of levers, one at each side of the front of said seat member, said levers being pivotally mounted with respect to said frame structure and extending upwardly with respect to said seat portion, said levers when moved outwardly away from said seat back portion being individually operative to brake the wheels located at their respective sides of said seat member.

3. The invention as defined in claim 2 wherein said levers additionally comprise said manually controlled means for actuating said clutches, said levers when moved inwardly toward said seat back portion being individually operative to engage the wheels located at their respective sides of said seat member.

References Cited by the Examiner
UNITED STATES PATENTS

| | | | |
|---|---|---|---|
| 269,609 | 12/82 | White | 280—261 |
| 331,113 | 11/85 | Bock | 280—208 |
| 353,935 | 12/86 | Gibbons et al. | 280—208 |
| 356,028 | 1/87 | Brown | 280—208 |
| 363,360 | 5/87 | Blossfield | 280—208 |
| 571,069 | 11/96 | Humbrecht | 280—208 |
| 601,107 | 3/98 | Simpier | 280—208 |
| 705,100 | 7/02 | Le Flem | 192—13 |
| 2,077,915 | 4/37 | Beyer | 188—71 |
| 2,893,519 | 7/59 | Martin | 188—71 |
| 2,938,303 | 5/60 | Bailey | 188—71 X |

MILTON BUCHLER, *Primary Examiner.*
KENNETH H. BETTS, *Examiner.*